(12) United States Patent
Richards

(10) Patent No.: X7868
(45) Date of Patent: Dec. 16, 1833

(54) TANNING SKINS & HIDES

(76) Inventor: George H. Richards

United States of America
Department of State

To all to whom these Presents shall come, Greeting

I certify that the annexed is a true copy of the Specification upon which Letters Patent were granted on the 24th day of [illegible] 1830 to David Flagg Junr for his improvement in machinery for threshing small grain called Flagg's Rotary Rice Thresher

L.S.

In testimony whereof I Asbury Dickins acting Secretary of State of the United States have hereunto subscribed my name and caused the Seal of the Department of State to be affixed. Done at the City of Washington this thirteenth day of June A.D. 1835. and of the independence of the United States of America the Fifty ninth Asbury Dickins

---

The Schedule referred to in these Letters Patent and making part of the same containing a description in the words of the said David Flagg Junr himself of his improvement in machinery for threshing small grain called "Flaggs Rotary Rice Thresher."

To all Persons to whom these Presents shall come. Be it known that I David Flagg Jr of the City County and State of New York have invented made constructed and applied to use a new and useful improvement in a machine for threshing small grains of every description called "Flaggs Rotary Rice thresher" for threshing Rice Wheat and other small grain from off the Straw which machine and its manner of use is as follows. to wit. The machine is constructed by having a frame four feet long two wide more or less according to the power intended to give it motion if for one horse two by four feet is of sufficient size. the frame may be made of joists or any other suitable materials.

two girts or side pieces to form each side of the frame. these are framed into four posts, and four other
short girts are framed into the said posts that form the ends of the frame. the side girts must be placed
at a suitable distance from each other so as to make the bearings for the journals of the Cylinder
shafts. and to bring them at their given distance from each other. which depends wholly on
the diameter of the cylinders. Within this frame are placed two, three or more cylinders which
are made and constructed as ... follows. take a log of wood of suitable size to give the dimen
sions required when turned. which can only be ascertained by the size of the wheel and pinion
which connects two of the cylinders together. through the centre of these cylinders are wrought
iron shafts which extends through each end so as to form the journals. The Cylinder which
is called the feed cylinder and on whose shaft the driving wheel and pulley is placed. is
filled with rows of teeth and running directly around the cylinder and may be placed one
inch apart more or less according to the size of the teeth which may be varied in size as may
be thought fit. they may be placed very near together. and project one and half inch more
or less. these teeth may be made of wrought or cast iron and varied in form. and may be
set in straight or spiral rows. or in any other form or shape that may suit the builder.
The top cylinder which is called the beater which operates upon the grain and threshes the
same. On this cylinder shaft is a pinion which gears with the main wheel on the feed cylinder;
in this cylinder are placed rows of teeth and are so arranged as to pass directly through the spaces
between the rows of teeth in the feed cylinder. these teeth must nearly fill the spaces. there must
be from six to eight teeth to form a row round the cylinder. and may be varied in form as
those of the feed cylinder. Directly under the beater is placed a cylinder which is called the
relief bed. this cylinder may vary in size from 5 to 6 in (more or less) in this are placed
rows of teeth corresponding with those of the feed cylinder. this may or may not be connected
with any other cylinder. This last named cylinder may be dispensed with and a permanent
concave bed. with teeth put in its place. which would answer the same purpose for many sorts
of grain. The feed table on which the grain is placed before threshed. is an inclined plane sim-
ilar to other machines. There is a bar placed across the machine and nearly over the feed cylin-
der. in this bar are placed rods or springs which pass down between the rows of teeth in the
feed cylinder to prevent the grain from passing any faster than required for threshing.
What I claim as my invention and improvement is the manner and form in which the cylinders
operate together as above described for the aforesaid purposes. New York November 19th 1830

Recd. Witnesses

[illegible] — H. L. Flagler

[illegible] Goldsmith

David Flagg Junr (Patented 29 Nov 1830)

S 26 [illegible]

George. H. Richards
Letters Patent.

The Schedule referred to in these Letters Patent and making part of the same containing a description in the words of the said George H. Richards himself of his improvement in the mode of rendering a variety of articles Water Proof by means of fluid Caoutchouc and of otherwise using that substance so as to produce new and valuable results.

To all whom it may concern! Be it known that I George H. Richards have discovered a new and useful mode or new and useful modes of rendering a variety of articles water proof by means of fluid Caoutchouc, and of otherwise using that substance so as to produce new and valuable results: and that the following is a full and exact description of my said invention or discovery — It is well known that the substance commonly called gum elastic or india rubber: but more correctly Caoutchouc is produced by the dessication of the sap or juice of several plants and trees, and particularly of Haevia Caoutchouc and Jatropha Elastica, growing in the Southern part of this Continent: and from the Urcela Elastica of Asia.

This substance in the fluid form has never been applied to the purposes of manufacturing or preparing of many things to which it is peculiarly applicable altho' bottles, boots, shoes, balls, and sheets have been formed thereof in the places where the above named and similar plants grow; It is true that for the purposes of Philosophical experiment small portions of the juice have been taken to Europe and brought to this Country but it has never been advantageously employed for the purposes of utility until it was done by me.

Solutions of the indurated substance as usually imported have been made in ether naphtha: oil of sassafras, spirits of turpentine. Spirits of Coal tar and other liquids and a varnish has been thus made which has been occasionally applied to useful purposes and so far as thus applied: the solution is ~~thus~~ excepted from my use and application of Caoutchouc.

My application of Caoutchouc consists principally in the application of it from its original fluid State and I use it either substantively, that is to say by itself alone, or I employ it in connexion with other substances, as a cement, or as a varnish, or a covering, or impregnation, or saturation, or stiffening. By its use I render the object to which it is applied either elastic or more durable, or waterproof, or airtight according to their natures and the purposes to which they are to be applied.

When used as a cement or varnish, I sometimes employ it alone but generally mix it with glue, pitch, tar, copal, or other adhesive or brightening articles, it may be employed either in a cold or warm state, though the warm may generally be considered preferable.

Without attempting to enumerate or specify the various objects or substances to which I mean to apply the fluid Caoutchouc I will mention a few of them. I apply to cloth of every kind, to ropes, cordage, strings - to all articles manufactured from fibrous materials - to the products or fabrics generally, of wood, leather, metals, and minerals, cotton hemp, flax, wool silk &c, to cover, or saturate leather wood or other porous substances, to varnish metals to preserve them from oxydation. For these and other objects I sometimes mix with fluid Caoutchouc the earths, metallic oxides and carbonaceous substances, either simply or in combination, but generally in a state of minute division; and I thus produce a variety of compound substances, having almost any degree of hardness, possessing many proportions of Caoutchouc, or combining ornament with utility, according to the nature and objects of the mixture. The action of atmospheric air and of solar heat is sufficient to convert the fluid into a solid substance, but it may sometimes be expedient to facilitate the process by artificial heat. The Caoutchouc or its compounds may be applied by dipping the article to be covered or saturated, into it, or a brush may be used in the manner of varnishing. No particular directions are necessary on this point as everything must depend upon the nature of the substance upon which the operation is performed. I claim as original, the useful application of the native fluid Caoutchouc, as set forth in this Specification, either alone, or in combination when employed for the purposes, or in the manner herein before set forth.

Witnesses
Jno. Chalmers
Solomon Hubbard

George H. Richards.

(Patented 11 April 1831) (332 words).

United States Patent
Patent No.: X7868
X7868
G. H. Richards,
Tanning Hides.
Patented Dec. 16, 1833.
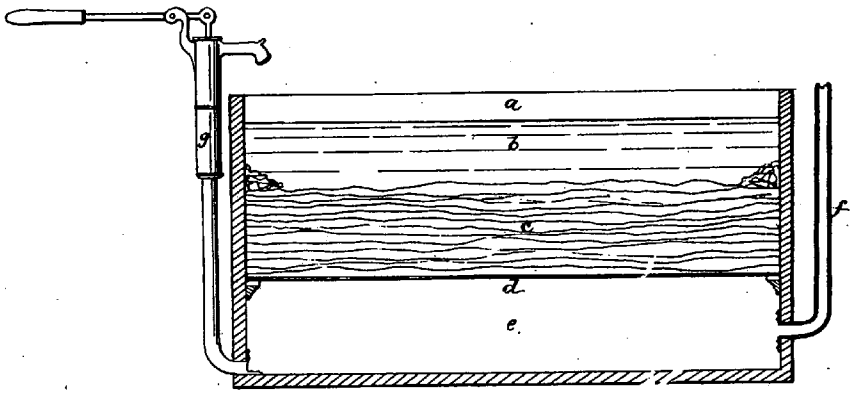
N. PETERS, PHOTO-LITHOGRAPHER, WASHINGTON, D. C.